(12) United States Patent
Rambeau

(10) Patent No.: US 12,253,010 B2
(45) Date of Patent: Mar. 18, 2025

(54) FLARE AND GAS POWERED SYSTEM

(71) Applicant: Brady W. Rambeau, Oceanside, CA (US)

(72) Inventor: Brady W. Rambeau, Oceanside, CA (US)

( * ) Notice: Subject to any disclaimer, the term of this patent is extended or adjusted under 35 U.S.C. 154(b) by 0 days.

(21) Appl. No.: 18/442,935

(22) Filed: Feb. 15, 2024

(65) Prior Publication Data

US 2024/0280035 A1    Aug. 22, 2024

Related U.S. Application Data

(60) Provisional application No. 63/446,834, filed on Feb. 18, 2023.

(51) Int. Cl.
| | | |
|---|---|---|
| *F01K 15/00* | (2006.01) | |
| *F01K 23/18* | (2006.01) | |
| *F22B 1/28* | (2006.01) | |
| *F23G 7/08* | (2006.01) | |
| *H02K 7/18* | (2006.01) | |

(52) U.S. Cl.
CPC .............. *F01K 15/00* (2013.01); *F01K 23/18* (2013.01); *F23G 7/08* (2013.01); *H02K 7/1823* (2013.01); *F22B 1/28* (2013.01); *F23G 2206/203* (2013.01)

(58) Field of Classification Search
CPC . F01K 15/00; F01K 23/18; F23G 7/08; F23G 2206/203; H02K 7/1823; F22B 1/28
See application file for complete search history.

(56) References Cited

U.S. PATENT DOCUMENTS

| | | | | |
|---|---|---|---|---|
| 3,792,688 | A  * | 2/1974 | Grainger ................. | F22B 31/00 123/549 |
| 2012/0047894 | A1 * | 3/2012 | Ward ...................... | F01B 23/10 60/716 |
| 2024/0077045 | A1 * | 3/2024 | Schoell ................... | F24S 10/45 |
| 2024/0133319 | A1 * | 4/2024 | Mayer ..................... | F01K 11/02 |

* cited by examiner

*Primary Examiner* — Hoang M Nguyen
(74) *Attorney, Agent, or Firm* — CP LAW GROUP PC; Cy Bates

(57) ABSTRACT

A flare and gas powered system is disclosed, the system includes a flare configured to burn within a chamber. Oxygen from steam, water, air, specialty gases or a combination thereof is provided to fuel the burning flare. Heated gases from the burning flare are directed to power a steam turbine, electric generator, steam engine electric generators, Stirling engine electric generator, solar panels, thermal panels, or a combination thereof to produce electrical and mechanical energy.

20 Claims, 8 Drawing Sheets

FLARE AND GAS POWERED SYSTEM

CROSS-REFERENCE TO RELATED APPLICATIONS

This application claims benefit of priority with U.S. Provisional Application Ser. No. 63/446,834, filed Feb. 18, 2023; the entire contents of which are hereby incorporated by reference.

BACKGROUND

Field of the Invention

The disclosure relates to a flare and gas powered electric generator and mechanical energy pump system, more particularly, to a flare and gas powered system for underwater or aerial applications

Description of the Related Art

Underwater and aerial vehicles, among other machinery, use various means of power generation. However, many of the conventional solutions have deficiencies with their respective application. An all-battery solution with aerial vehicles such as drones are relatively heavy which affects range and flight time. Battery powered submarines have very limited ranges and nuclear power submarines are very expensive to manufacture and operate due to complexity and safety concerns.

There is a need for an underwater and aerial power system to generate electrical and mechanical energy for use in existing and future battery powered submersible vehicles, submarines, underwater equipment and aerial vehicles.

Patents illustrative of some of these prior art machines and systems include U.S. Pat. Nos. 2,972,922; 6,211,452; 3,872,765; 5,260,510; 5,440,071; 10,818,279; 5,575,576; 6,590,508; 3,267,248; 9,165,476; 9,076,419 and 6,501,011

SUMMARY

A flare and gas powered system is disclosed, the system comprises a flare configured to burn within a chamber. Oxygen from steam, water, air, specialty gases or a combination thereof is provided to fuel the burning flare. Heated gases from the burning flare are directed to power a steam turbine, electric generators, steam engine electric generators, Stirling engine electric generator, solar panels, thermal panels, or a combination thereof to produce electrical and mechanical energy.

In some embodiments, the flare and gas powered system is configured to operate in underwater conditions wherein the system comprises a water chamber, a second chamber to be used as a boiler, and a third steam pressurized chamber which is to be used as a burning and processing chamber for the flare and various gases. The flare and gas powered system may be used for underwater applications works by providing an underwater electrical power station for recharging batteries on submarines that are carrying people and objects to and from the surface of the water. The flare and gas powered system can be used for providing power to all types of electric, pneumatic, hydraulic, steam and mechanical powered machinery.

In some embodiments a flare and gas powered system used for underwater applications works by burning and reforming natural gases that come from underwater wells. These gases can be directly piped from an underwater well to an underwater flare and gas powered system. This eliminates having to transport and store these gases on land. And the operation's by-product gases which contain greenhouse carbon gases can be kept contained deep underwater.

Flares have a higher energy density than sealed lead batteries of similar weight and size and are a great substitute or compliment with many existing battery systems. In one study, it was found flares equal in size and weight to a standard sealed lead acid battery outputted twelves times the energy.

In some embodiments, the flare and gas powered system is configured to operate in aerial conditions with a water tank and a single chamber for burning flares and gases.

In some aerial application embodiments, the existing battery system is partially removed to allow the flare powered system to integrate there within. In one example, about half of the existing batteries are removed. In addition to the flare powered system being lighter than the batteries it replaced, the flare powered system will also decrease in weight as the water and flares are consumed. When the remaining batteries reach a certain lower amount of charge the flare powered system is configured to startup to recharge the batteries. A portion of the heat from the flare powered system can be used to ensure the batteries maintain optimal thermal conditions.

Modern battery powered electrical vertical takeoff landing (evtol) vehicles have short operating times and distances. Four stroke engines and their adjoining transmissions which are incorporated in helicopters work extremely hard in their operations because of all the vibrating forces from the helicopter's fast revolving rotors. Because of this those powerplants must be vigorously inspected and overhauled which makes them very expensive to operate. Turbine driven helicopters are very expensive to purchase and maintain.

In some embodiments helicopters that use the flare-battery hybrid system may incorporate a dual motor in tandem system to give the helicopter a back-up motor for a dual-redundance advantage. Having a motor on the bottom and another motor in the middle of the rotor drive shaft enables the bottom motor to work as a harmonic balancer. Furthermore, having two motors gives the helicopter stronger lift capabilities. In some embodiments a helicopter utilizes a dual motor in tandem system where one of the electric motors is AC powered and the other is DC powered. Utilizing an electric motor on the tail for the helicopter's stabilizing rotor eliminates the need for a long drive shaft assembly to go back there to power that rotor.

Use of the flare-battery hybrid system in conjunction with aerial vehicles has additional benefits beyond those already explained. Due to the fact that no flammable liquid fuels are needed in its operational processes, the flare powered system is much safer during an aerial crash with its unused flares being safely contained in a high strength storage box.

BRIEF DESCRIPTION OF THE DRAWINGS

Other features, combinations, and embodiments will be appreciated by one having the ordinary level of skill in the art upon a thorough review of the following details and descriptions, particularly when reviewed in conjunction with the drawings, wherein.

DETAILED DESCRIPTION

Figure 1:
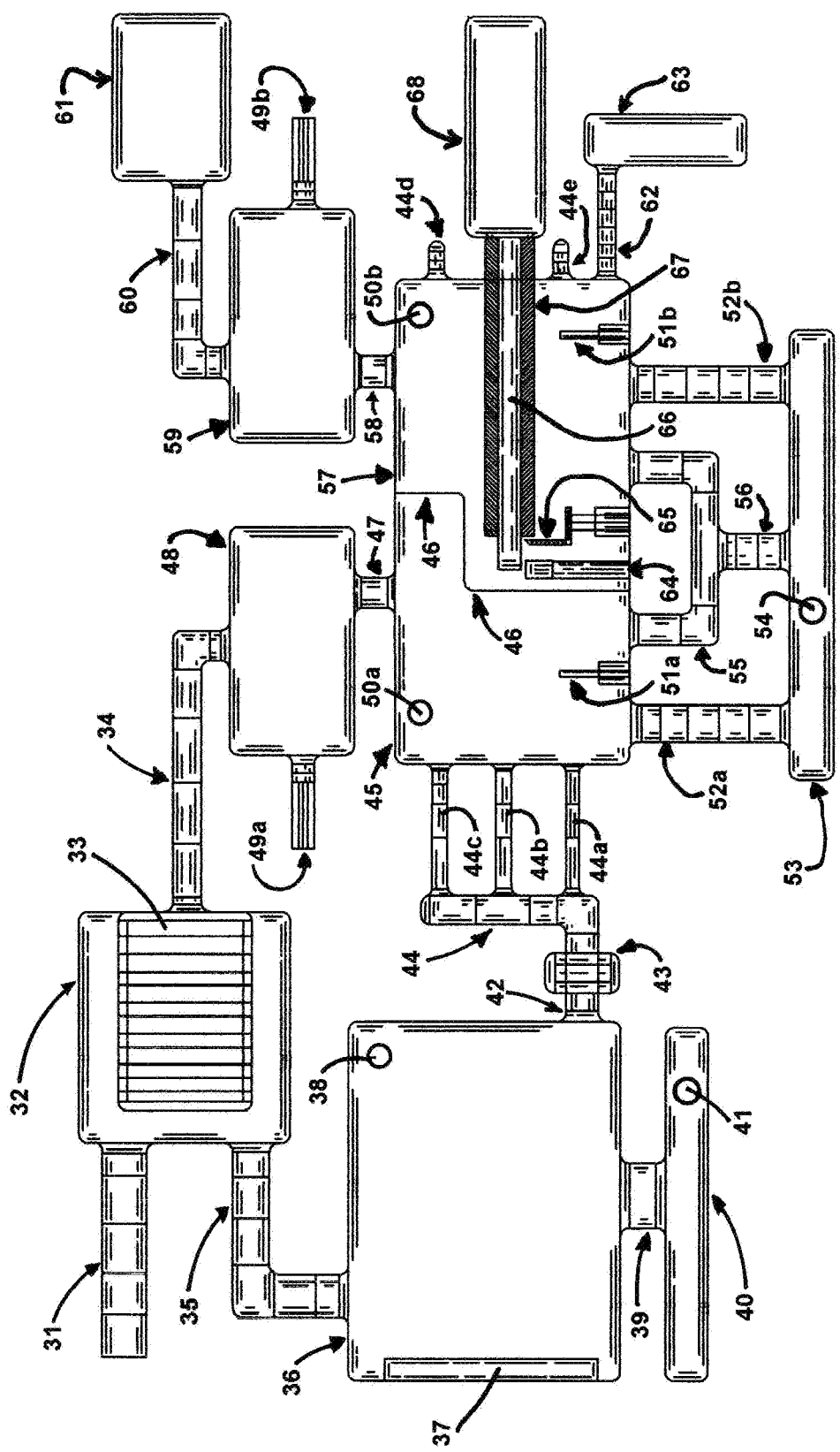
FIG. 1 shows a schematic view of a flare and gas powered system for underwater applications in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term 'flare' (also known as a fusee) means a pyrotechnic configured to produce intense heat and light without an explosion. The flare is ideal in this power system because flares contain various oxidizers that enable the flare and its off gases to properly burn at a high temperature in a pressure regulated steam atmosphere. Various types of combustible gases require a high temperature to properly ignite. The flare and gases are designed to burn together and reform gases within this power producing system to produce high temperature gases. Heat and light which can ultimately be used to generate steam and electrical power.

The flares that are used in the flare and gas powered systems are individually designed to work with each different particular type of operation to ensure their maximum performance within that particular operation. These flares are manufactured with any and all types of substances, materials and components within their specialized conglomerations and are made to any and all specific lengths, widths, heights, diameters, shapes, styles and weights.

Unless explicitly defined herein, terms are to be construed in accordance with the plain and ordinary meaning as would be appreciated by one having skill in the art.

General Description of Embodiments

In one embodiment, a flare and gas powered system is disclosed. The flare and gas powered system comprises a water tank chamber configured to receive water. A steam producing chamber is fluidly coupled to the water tank chamber and configured to receive water from the water tank chamber. A flare and gas burning and reforming chamber is also fluidly coupled to the water tank chamber. The flare and gas burning and reforming chamber is disposed adjacent to the steam producing chamber and separated by a shared wall. The flare and gas burning and reforming chamber is a steam pressured chamber. A flare is at least partially disposed inside the flare and gas burning and reforming chamber. The flare comprises an end configured to burn within the flare and gas burning and reforming chamber. A steam powered electric generator is fluidly coupled to a top portion of the steam producing chamber for producing electricity.

In some embodiments, the system may further comprise a first dumped water and sludge containment tank coupled to a bottom of the water tank chamber, the first dumped water and sludge containment tank comprising a first tank drainage valve configured to drain out water and sludge.

In some embodiments, the system may further comprise a reciprocating engine, a turbine, a generator, or a combination thereof coupled to a top portion of the flare and gas burning and reforming chamber.

In some embodiments, the system may further comprise a water tank assembly fluidly coupled to the water tank chamber, the water tank assembly configured to transfer water to the water tank chamber, the water tank assembly further comprising a steam condenser disposed inside the water tank assembly. The steam powered electric generator may be fluidly coupled to the steam condenser of the water tank assembly.

In some embodiments, the system may further comprise a first internal emergency high temperature electric heating element disposed within the steam producing chamber, wherein the first high temperature electric heating element is configured to create steam when injected with water from the water tank chamber. The system may further comprise a second internal emergency high temperature electric heating element disposed within the flare and gas burning and reforming chamber, wherein the second high temperature electric heating element is configured to create steam when injected with water from the water tank chamber.

In some embodiments, the system may further comprise a second dumped water and sludge containment tank coupled to a bottom portion of the steam producing chamber, the flare and gas burning and reforming chamber, or both, the second dumped water and sludge containment tank comprising a second drainage valve.

In some embodiments, the system may further comprise a steam pipe with a one-way check valve assembly fluidly to each of the steam producing chamber and the flare and gas burning and reforming chamber, the steam pipe with a one-way check valve assembly configured to pump steam from steam producing chamber into the flare and gas burning and reforming chamber.

In some embodiments, the system may further comprise a venting system coupled to the flare and gas burning and reforming chamber by an inlet pipe, the venting system configured to pump a gas into the flare and gas burning and reforming chamber for safely clearing the flare and gas burning and reforming chamber of volatile gases.

In some embodiments, the system may further comprise a pressure sealed ceramic tube conveyor surrounding the flare, the pressure sealed ceramic tub conveyor extends from the inside to an outside of the flare and gas burning and reforming chamber. The system may further comprise a flare storage and loading unit coupled to the pressure sealed ceramic tub conveyor, the flare storage and loading unit configured to feed one or more flares into the flare and gas burning and reforming chamber through the pressure sealed ceramic tube conveyor. The pressure sealed ceramic tube conveyor may be configured to seal the flare and gas burning and reforming chamber from high pressure leakage of internal hot gases.

In some embodiments, the system may further comprise a flare ignitor disposed inside flare and gas burning and reforming chamber. The flare ignitor may be configured to swivel or retract away from the end of the flare.

In some embodiments, the system may further comprise a flare cut-off tool disposed below the flare. The flare cut-off tool may be configured as a closure gate to block the sealed ceramic tube conveyor. The flare cut-off tool may be configured to swivel or retract away from the end of the flare.

In some embodiments, the system may further comprise a plurality of flares. The system may further comprise a plurality of pressure sealed ceramic tube conveyors.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

First Illustrated Embodiments

Now turning to the drawings, FIG. 1 shows a flare and gas powered system used for underwater and aerial applications in accordance with a first illustrated embodiment. Underwater applications can include steam, hydraulic, pneumatic, mechanical and electric power generators for submarines and other underwater machinery. In the illustrated embodiment, the flare and gas powered system utilizes steam as an oxygen source in the flare and gas burning and reforming chamber 57 for flares and gases to burn oxygen from. Regular air contains about a twenty percent oxygen count. Steam from water contains a 50 percent oxygen and 50 percent hydrogen count. Steam saturation in the flare and gas burning and reforming chamber 57 also works to properly position and then evacuate hot, volatile gases from inside the chamber. This burning process produces hot hydrogen gas along with other hot exhaust gases that interact with a steam electric generator and/or a Stirling engine electric generator to produce electricity. These hot exhaust gases are known as Syngas and can be salvaged and processed for other uses in other applications.

The shapes, styles, arrangements, placements, compositions, materials and amounts of components described herein are a general conception of how these systems operate and will vary in embodiments between all systems.

Water, such as de-ionized mineral-free water, is piped in thru a water pipe with check valves assembly 31 into a water tank assembly 32 that has an incorporated an internal steam condenser 33.

All piping, pump, over pressure, sludge water, one-way and check valved assemblies incorporated in these systems are mechanically and computer controlled to ensure that the pump is properly operated and that the over pressure, one-way and check valve assemblies can be properly opened and closed in the event of an excessive pressure in a chamber or a piping system rupture/failure. These piping, pump and check valved assemblies can be operated and powered with any or all types of electric, pneumatic, hydraulic, steam and mechanical power.

A steam piping, pump and check valves assembly 34 sends spent steam that is released from a steam powered electric generator 48 into the steam condenser 33 for the purpose of condensing the steam back into water.

Water is piped out of the water tank 32 thru a water piping, pump and check valves assembly 35 into a water tank chamber 36. The water tank chamber 36 incorporates a water flow gauge 37 to regulate the water flow thru pipes and check valves assemblies 35, 39 and 42. The water tank chamber 36 incorporates a tank pressure gauge 38.

A water over pressure relief and sludge release check valves, piping and pump assembly 39 is located on a bottom of the water tank chamber 36 for tank water and sludge clean out and emergency tank over pressure relief purposes. The over pressure relief and sludge release valves, piping and pump assembly 39 is connected to a dumped water and sludge containment tank 40. The dumped water and sludge containment tank 40 incorporates a tank drainage valve 41 for draining out water and sludge.

Water flows out of the water tank chamber thru a check valve and water pipe assembly 42 into a water pump motor 43. The water pump motor pumps water thru the water pipes with check valves and injectors 44, 44a, 44b, 44c, 44d and 44e for precision water injection into both a steam producing chamber 45 (44a, 44b, 44c) and the flare and gas burning and reforming chamber 57 (44d, 44e). For clarity, injectors 44d and 44e are fluidly coupled to injector 44 and are illustrated wrapping around the flare and gas burning and reforming chamber 57 in order not to obstruct view the flare and gas burning and reforming chamber 57 or the steam producing chamber 45.

The steam producing chamber 45 and the flare and gas burning and reforming chamber 57 are separated by a shared wall 46 that is heated by a flare 66 which is burning in the flare and gas burning and reforming chamber 57. The separating wall 46 works as a flash pan and/or boiler assembly when water is injected onto it from the water pipes with check valves and injectors assemblies 44. Other means for creating steam can also be utilized as can be appreciated by one having skill in the art. An advantage of a flash boiler is reduction of weight and boiling time. Submarines utilizing this system will also incorporate an external steam tank outside the system to help maintain proper steam pressures for emergency safety purposes.

The steam producing chamber 45 has a steam pipe with check valves assembly 47 located on top of the chamber to pump steam into the steam powered electric generator 48 or to power a steam engine drive train.

In some embodiments the steam powered electric generator 48 turbine or mechanical generator and/or Stirling engine electric generator 59 utilizes water from the water pipes with check valves and injectors assemblies 44 for proper cooling and operation of all components.

Electricity that is produced by the steam powered electric generator 48 is sent out thru an electrical wire assembly 49a to electrical power and battery banks located in the submarine, aerial vehicle or power station.

The steam pipe with check valves assembly 34 sends spent steam that is released from the steam powered electric generator 48 into the steam condenser 33 for the purpose of condensing the steam back into water. In some embodiments where aerial applications incorporate a steam condenser 33, the steam condenser 33 may be incorporated inside of water tanks that have been strategically located within the aircraft's structure.

The steam producing chamber 45 incorporates an internal temperature and pressure gauge 50a for proper regulation of chamber pressures.

The steam producing chamber 45 incorporates an internal emergency high temperature electric heating element 51a which is designed to create steam when it is injected with water from the water pipes with check valves and injectors assemblies 44. This emergency steam will prime the chambers up to proper operating pressures for system start up.

A steam over pressure relief and sludge release check valves, piping and pump assembly 52a is located on the bottom of the steam producing chamber 45 for tank water and sludge clean out and emergency tank over pressure relief purposes. The over pressure relief and sludge release valves, piping and pump assembly 52a is connected to a dumped water and sludge containment tank 53. The dumped water and sludge containment tank 53 incorporates a tank drainage valve 54 for draining out water and sludge.

As shown, a steam pipe with a one-way check valve assembly 55 is located on or near the bottom of the steam producing chamber 45 for the purpose of pumping steam from the steam producing chamber 45 into the bottom or near the bottom of the flare and gas burning and reforming chamber 57. The steam pipe and check valves assembly 55 incorporates a water and sludge piping, pump and check valves assembly 56 that is connected to the dumped water and sludge containment tank 53.

Preferably, the flare and gas burning and reforming chamber 57 will be a steam pressurized chamber. This is to ensure a continuous oxygen supply for the flares 66 and gases to burn oxygen from and to also maintain a pressurized steam saturation within the chamber for properly positioning and evacuating hot volatile gases from the chamber. Having a pressurized saturation of steam in this chamber ensures that the hot, volatile hydrogen gases and other exhaust gases will safely sit on top of the steam in the chamber during processes and gases removal.

The flare and gases burning and reforming chamber 57 comprises an internal temperature and pressure gauge 50b for proper regulation of chamber temperatures and gas pressures.

The flare and gases burning and reforming chamber 57 comprises an internal emergency high temperature electric heating element 51b which is designed to create steam when it is injected with water from the water pipes with check valves and injectors assemblies 44. This emergency steam will prime the chambers up to proper operating pressures for system start up.

An auxiliary gases inlet pipe, pump and check valves assembly 62 is utilized by the flare and gas burning and reforming chamber 57 for the purpose of pumping in steam, fresh air or specialty gases from an external tank or venting system 63 to safely clear the chamber of volatile gases.

A flare storage and loading unit 68 feeds the flare 66 into a pressure sealed ceramic tube conveyor for flares 67 that extends from the outside to the inside of the flare and gas burning and reforming chamber 57. The pressure sealed ceramic tube conveyor for flares 67 unit is designed to feed and properly place the flare 66 for operations via received signals of the burning flare's tip location. The pressure sealed ceramic tube conveyor for flares 67 unit is configured to seal the flare and gas burning and reforming chamber 57 from high pressure leakage of internal hot gases.

A flare ignitor 64 is used to ignite the burning flare 66. The flare ignitor 64 uses electricity for high temperature or static ignition to properly ignite the flare 66.

In some embodiments, the flare ignitor 64 is configured to swivel or retract away from the end the flare 66 when not being used. This allows the flare ignitor 64 a longer service life.

A flare cut-off tool 65 is located underneath the end of the burning flare 66 to cut-off the burning end of the flare 66 to stop the burning process. The flare cut-off tool 65 can utilize a cut-off saw or a cut-off blade for its proper operation.

In some embodiments the flare cut-off tool 65 is also configured to work as a closure gate to block the end of the ceramic tube conveyor 67 to contain the chamber's gases. The flare cut-off tool 65 can also swivel or retract away from the end the flare 66 when not being used. This allows the flare cut-off tool 65 a longer service life The flare and gas burning and reforming chamber 57 has a steam and exhaust gases piping, gas pump and check valves assembly 58 located on top of the chamber to pump the hot exhaust gases into a turbine or mechanical generator and/or Stirling engine electric generator 59. In some embodiments the turbine or mechanical generator and/or Stirling engine electric generator 59 will utilize water from the water pipes with check valves and injectors assemblies 44 for proper cooling and operation of all components.

The hot exhaust gases exit the Stirling engine electric generator 59 thru an exhaust gases piping, pump and check valves assembly 60 where they are directed into exhaust gases processing unit 61. These hot exhaust gases are a mixture of carbon monoxide and hydrogen gases which is commonly known as Syngas. This Syngas can be salved and processed for use in other applications. In some embodiments, the Syngas is used to power a simple cycle gas turbine to further extract more power from within the system's operations and to safely convert dangerous carbon monoxide gas into carbon dioxide.

The electricity that is produced by the Stirling engine electric generator 59 is sent out thru an electrical wire assembly 49b to electrical power and battery banks located in the submarine, aerial vehicle or power station.

A steam over pressure relief and sludge release check valves, piping and pump assembly 52b is located on the bottom of the flare and gas burning and reforming chamber 57 for tank water and sludge clean out and emergency tank over pressure relief purposes. The over pressure relief and sludge release valves, piping and pump assembly 52b is connected to the dumped water and sludge containment tank 53.

The shapes, styles and arrangements of components described herein are a general conception of how these systems operate and will vary between all systems.

Figure 2:
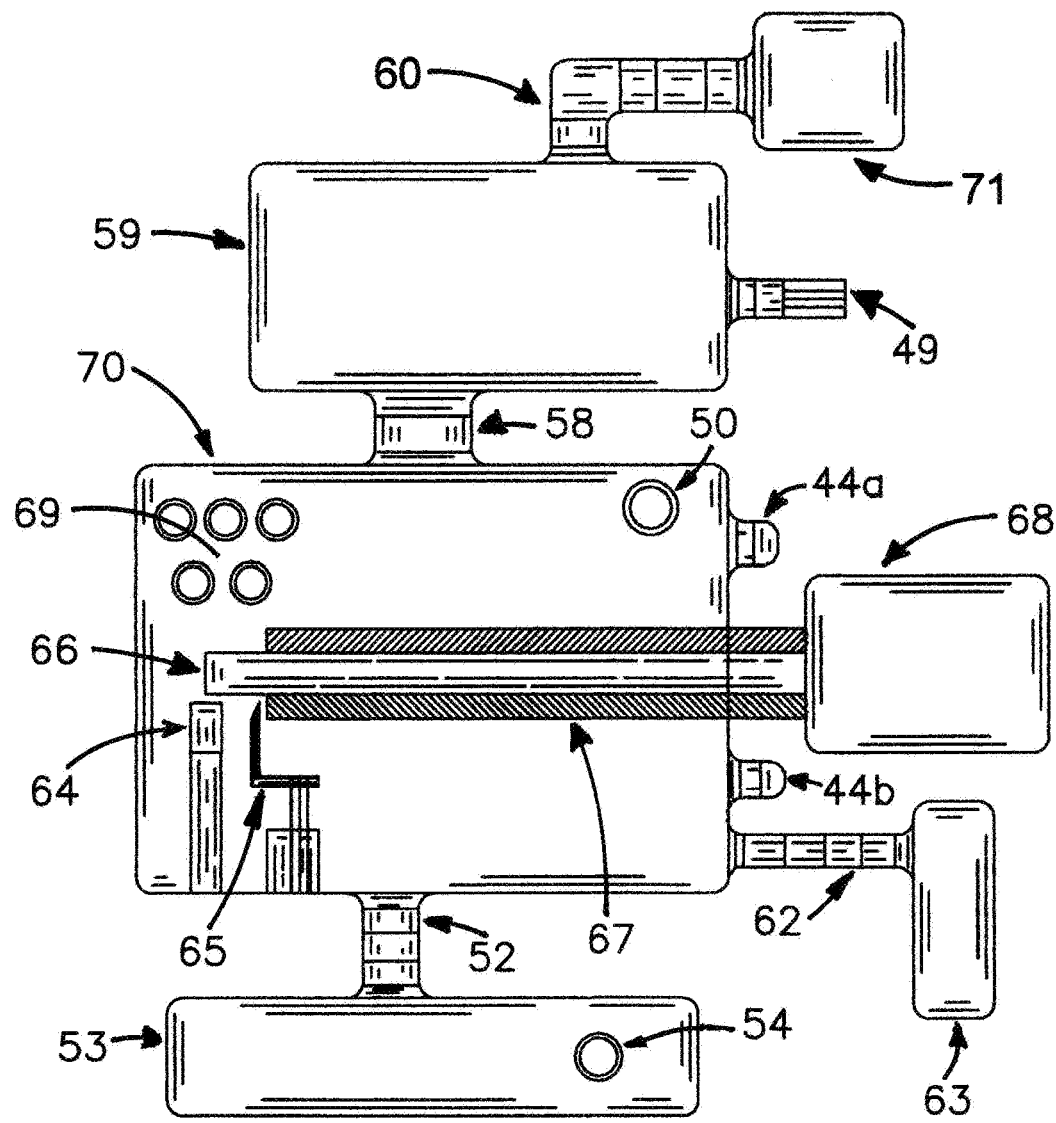
FIG. 2 shows a schematic view of a flare and gas powered system for aerial applications in accordance with a second illustrated embodiment.

FIG. 2 shows an aerial-style flare and gas burning and reforming chamber 70 that is specifically designed for aerial applications. The aerial system may utilize a water tank (FIG. 1; 36) and condenser system (FIG. 1; 33) in its operation to supply water to an internal boiler system 69 disposed inside the aerial-style flare and gases burning and reforming chamber 70. In other embodiments, the aerial-style flare and gas burning and reforming chamber may not comprise a condenser system and instead can expel steam into the atmosphere.

The aerial-style power system is designed to work with or without a contained steam condenser 33 system.

The aerial-style flare and gas burning and reforming chamber 70 comprises an auxiliary fresh air or specialty gases inlet pipe, pump and check valves assembly 62 for the purpose of pumping in needed fresh air or specialty gases from an external tank or venting system 63 to safely clear the chamber of volatile gases.

A flare storage and loading unit 68 feeds a flare 66 into a pressure sealed ceramic tube conveyor for flares 67 that extends from the outside to the inside of the aerial-style flare and gas burning and reforming chamber 70. The pressure sealed ceramic tube conveyor for flares 67 unit is designed to feed and properly place the flare 66 for proper operations via received signals of the burning flare's tip location. The pressure sealed ceramic tube conveyor for flares 67 unit is designed to seal the aerial-style flare and gas burning and reforming chamber 70 from the high pressure leakage of internal hot gases.

A flare ignitor 64 is used to ignite the flare 66. The flare ignitor 64 uses electricity for high temperature or static ignition to properly ignite the flare 66. In some embodiments, the flare ignitor 64 is designed to swivel or retract away from the end the flare when not being used. This allows the flare ignitor 64 a longer service life.

A flare cut-off tool 65 is located underneath the end of the burning flare 66 to cut-off the burning end of the flare 66 to stop the burning process. The flare cut-off tool 65 can utilize a cut-off saw or a cut-off blade for its proper operation. In some embodiments the flare cut-off tool 65 is also designed to work as a closure gate to block the end of the ceramic tube conveyor to contain the chamber's gases. It can also swivel or retract away from the end the flare when not being used. This method gives the flare cut-off tool 65 a longer service life.

The aerial-style flare and gas burning and reforming chamber 70 comprises an internal temperature and pressure gauge 50 for proper regulation of chamber temperatures and gas pressures.

The aerial-style flare and gas burning and reforming chamber 70 has the water pipes with check valves and injectors assemblies 44a and 44b injecting water into various points inside the chamber for use in its internal boiler tubes 69 along with water for chamber cleaning and proper chamber temperature control. This boiler among other things works to create a low-pressure steam atmosphere within the aerial-style flare and gas burning and reforming chamber 70 to ensure an oxygen-rich atmosphere at high elevations.

In some embodiments, a radiator cooling system surrounds the aerial-style flare and gas burning and reforming chamber 70 for providing proper temperature control.

The steam that is produced from the internal boiler tubes 69 which are located inside aerial-style flare and gas burning and reforming chamber 70 is also directed into a steam and exhaust gases piping, pump and check valves assembly 58 located on top of the chamber to pump the steam and hot exhaust gases into any style of turbine or mechanical generator and/or Stirling engine electric generator 59. In some embodiments the turbine or mechanical generator and/or Stirling engine electric generator 59 will utilize water from the water pipes with check valves and injectors assemblies 44 for proper cooling and operation of all components.

The steam hot exhaust gases exit the turbine or mechanical generator and/or Stirling engine electric generator 59 thru an exhaust gases piping, pump and check valves assembly 60 where they are directed into an exhaust gases processing unit 71. These hot exhaust gases are a mixture of carbon monoxide and hydrogen gases which is commonly known as Syngas. This Syngas can be salvaged and processed for use in other applications. In some embodiments this Syngas is used to power a simple cycle gas turbine to extract more power from this system and to safely convert the dangerous carbon monoxide gas into carbon dioxide.

The electricity that is produced by the turbine and/or Stirling engine electric generator 59 is sent out thru an electrical wire assembly 49 to electrical power and battery banks located on the aerial vehicle.

The aerial-style flare and gas burning and reforming chamber 70 comprises a steam over pressure relief and sludge release piping, pump and check valves assembly 52 located on the bottom of the chamber for tank water and sludge clean out and emergency tank over pressure relief purposes. The over pressure relief and sludge release piping, pump and check valves assembly 52 is connected to a dumped water and sludge containment tank 53. The dumped water and sludge containment tank 53 incorporates a tank drainage valve 54 for draining out water and sludge.

Figure 3:
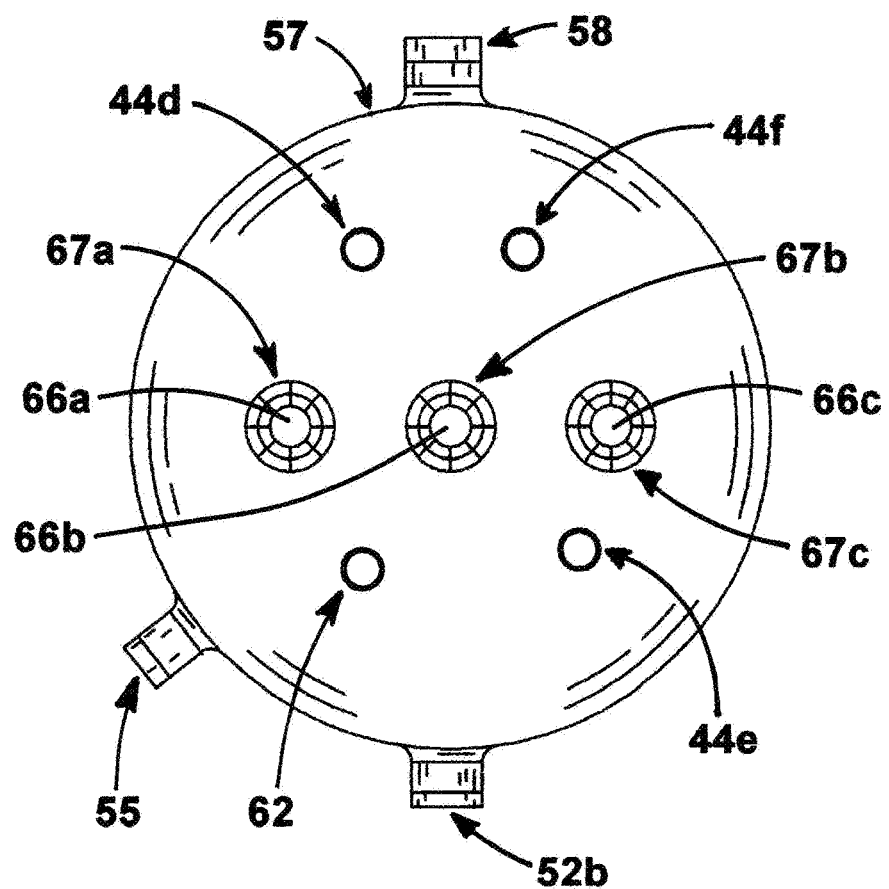
FIG. 3 shows a side view of a flare and gas powered system flare loading end of the combustion chambers in accordance with both first and second illustrated embodiments.

FIG. 3 shows a side view of an embodiment either the flare and gas burning and reforming chamber 57 and the aerial-style flare and gas burning and reforming chamber 70. In this embodiment this particular flare and gas powered system incorporates the usage of three flares 66a, 66b and 66c along with three pressure sealed ceramic tube conveyor for flares 67a, 67b and 67c in its operations. Three water pipes with check valves and injectors assemblies 44d, 44e and 44f are incorporated in this particular system. One auxiliary fresh air or specialty gases inlet pipe, pump and check valves assembly 62 is incorporated into this particular system. One steam pipe and check valves assembly 55 is incorporated into this particular system. One steam over pressure relief and sludge release piping, pump and check valves assembly 52b is incorporated into this particular system. One steam and exhaust gases piping, pump and check valves assembly 55 is incorporated into this particular system.

Figure 4:
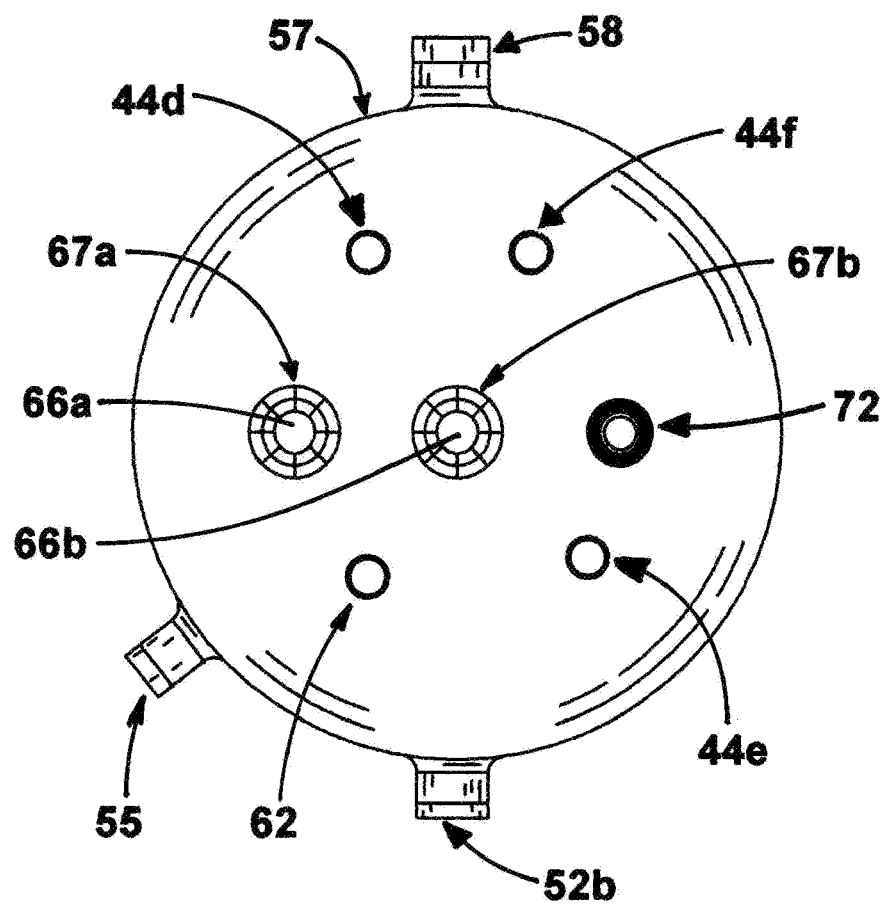
FIG. 4 shows a side view of an alternative flare and gas powered system flare loading end of the combustion chambers in accordance with both first and second illustrated embodiments.

FIG. 4 shows a side of an embodiment of either the flare and gas burning and reforming chamber 57 and the aerial-style flare and gas burning and reforming chamber 70. In this embodiment this particular system is designed to burn flares 66 together with reformable or combustible gases from a gas inlet 72. For safety purposes at least one burning flare can always stay ignited in the flare and gas burning and reforming chambers 57 and 70 to guarantee an ignition source for gases used within in these systems. This particular flare and gas powered system incorporates the usage of two flares 66a and 66b along with two pressure sealed ceramic tube conveyor for flares 67a and 67b in its operations. Three water pipes with check valves and injectors assemblies 44d, 44e and 44f are incorporated into this particular system. One auxiliary fresh air or specialty gases inlet pipe and check valves assembly 62 is incorporated into this particular system. One steam pipe and check valves assembly 55 is incorporated into this particular system. One steam over pressure relief and sludge release piping, pump and check valves assembly 52b is incorporated into this particular system. One steam and exhaust gases piping, pump and check valves assembly 55 is incorporated into this particular system.

Figure 5:
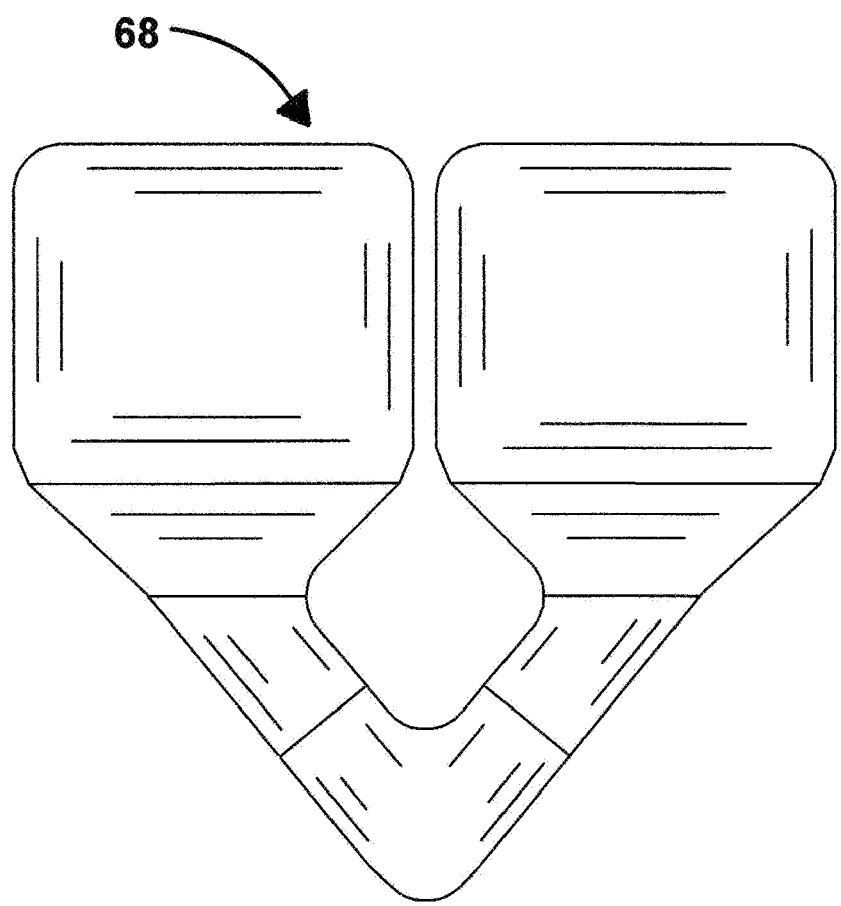
FIG. 5 shows a front view of a flare and gas powered system flare storage box according to the second illustrated embodiment.

FIG. 5 shows a two-flare storage box and loading unit 68. In some embodiments this two-flare storage box system and loading unit is used where both boxes are positioned on opposite sides of the electrical generator. Both storage boxes work in unison where each storage box takes turns loading a flare into the flare loading chute. This ensures that the weight of stored flares is evenly distributed during flight conditions.

Figure 6:
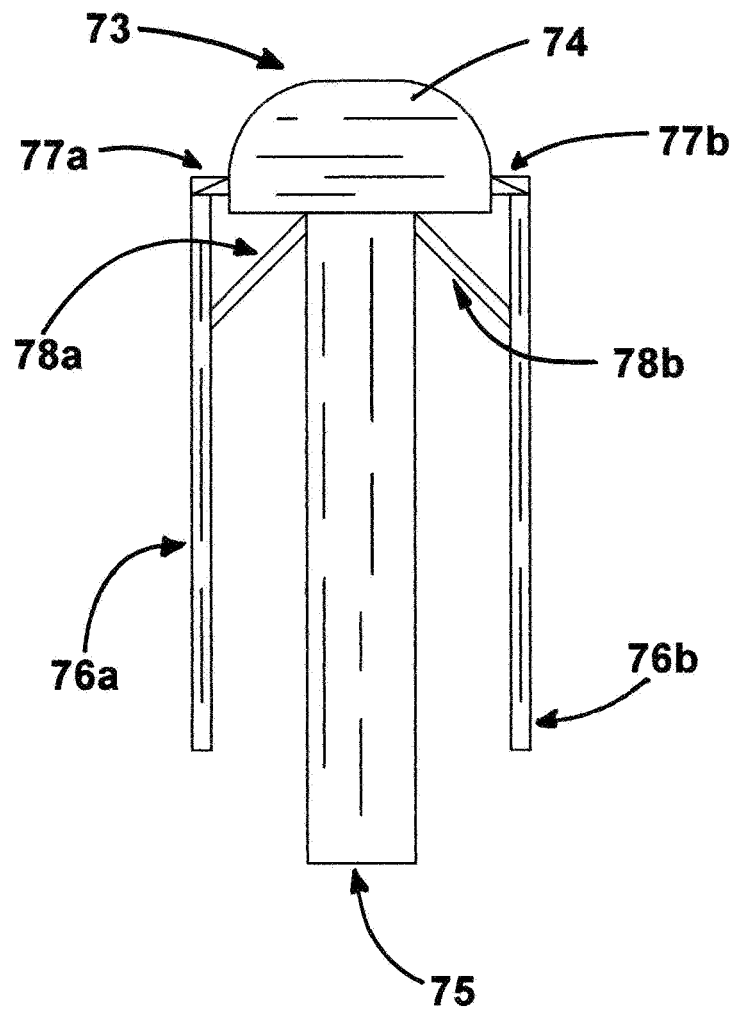
FIG. 6 shows a side view of an emergency rotor for aerial vehicle applications in accordance with a third illustrated embodiment.

FIG. 6 shows an optional collapsible emergency rotor assembly in the closed position 73. This emergency rotor assembly can be utilized into embodiments that incorporate several small rotors for their lifting purposes. This emergency rotor assembly is designed to open and spin freely in order to safely auto-rotate down an aerial vehicle from the sky in the event of a sudden power loss. Helicopters are designed to auto-rotate down via their rotors in an emergency power loss situation. In some embodiments the emergency rotor assembly 73 may incorporate a back-up power system that utilizes the steam and exhaust gases from the aerial-style flare and gas burning chamber 70 to temporarily power the emergency rotor assembly system. The emergency rotor assembly 73 incorporates an emergency rotor spindle assembly 74, an emergency rotor support strut 75, emergency rotor blades 76a and 76b, rotor blade swivel supports 77a and 77b and open rotor blade locking arm supports 78a and 78b. There can be any number of rotors blades that are incorporated into each one of these emergency rotor assemblies.

Figure 7:
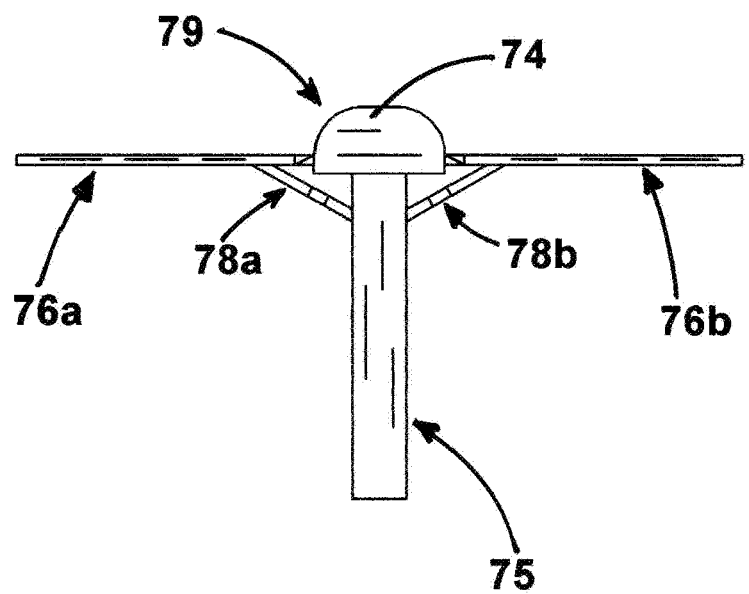
FIG. 7 shows an alternate side view of the emergency rotor for aerial vehicle applications according to the third illustrated embodiment.
Figure 8:
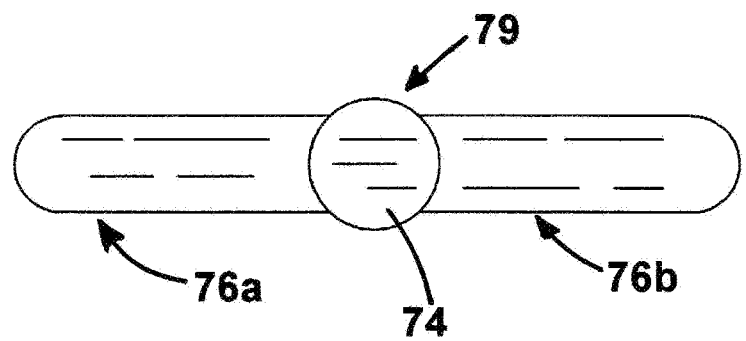
FIG. 8 shows a top view of the emergency rotor for aerial vehicle applications according to the third illustrated embodiment.

FIG. 7-8 show a fully opened emergency rotor assembly 79.

Figure 9:
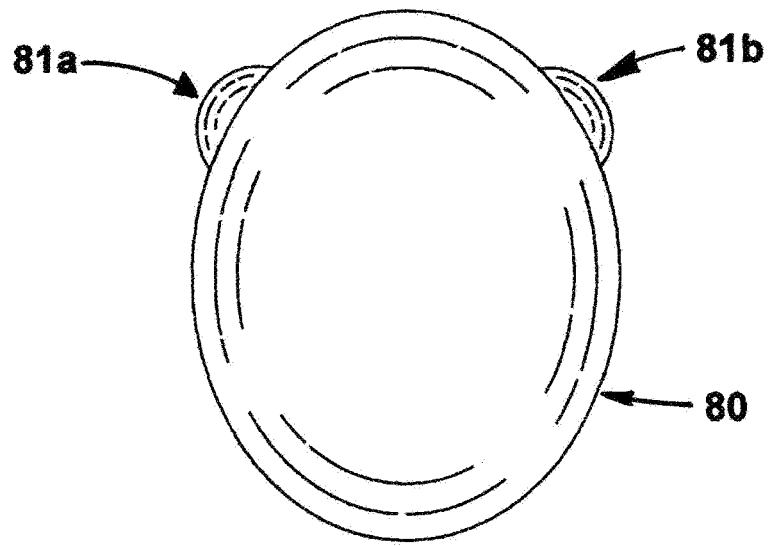
FIG. 9 shows a front view of an underwater submersible vehicle equipped with emergency banc bladders in accordance with a fourth illustrated embodiment.

FIG. 9 shows a front view of an embodiment comprising a submersible vehicle 80 that incorporates an optional emergency expanding gases bladders system 81a and 81b. Emergency expanding gases bladders system 81a and 81b are used to help keep the submersible vehicle 80 from sinking in emergency power loss situations. In some embodiments the emergency expanding gases bladders system 81a and 81b and submersible vehicles 80 are designed as submersible barges to lift cargo to the water's surface. The emergency expanding gases bladders system 81a and 81b are made of any types of materials and are of any sizes. There can be any number of expanding gases bladders system 81a and 81b that are incorporated into this type of submersible vehicle 80.

Figure 10:
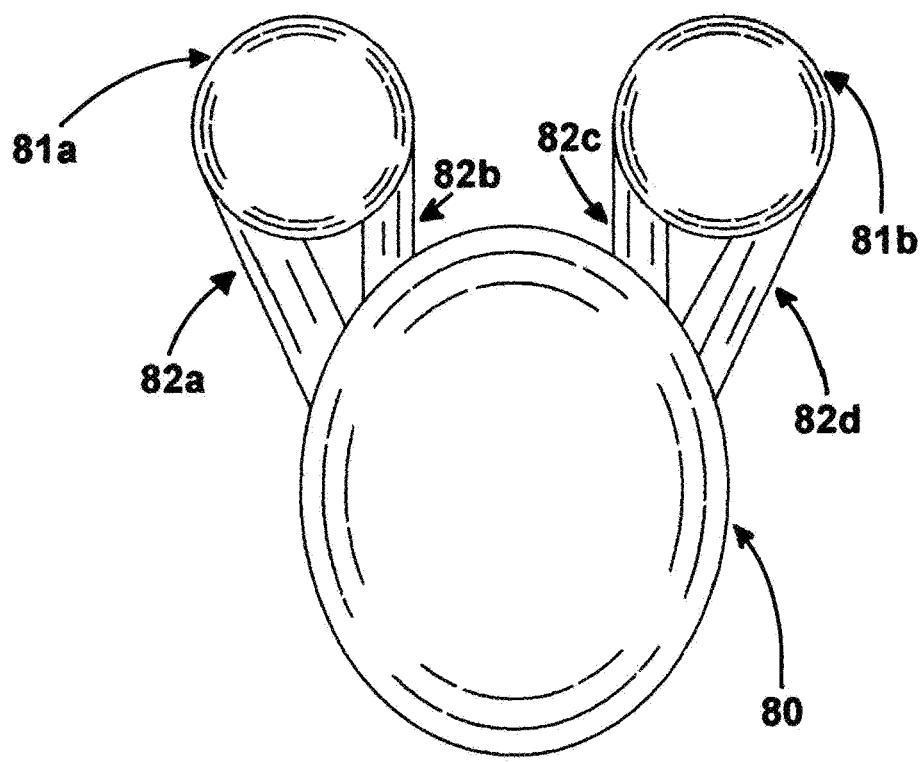
FIG. 10 shows an alternative front view of the underwater submersible vehicle equipped with emergency bladders in accordance to the fourth illustrated embodiment.

FIG. 10 shows a submersible vehicle that has the expanding gases bladders system 81a and 81b filled with either gases from storage tanks or with exhaust gases that are expelled from the flare and gas burning and reforming chamber 57. Bladders to submersible vehicles attachment straps 82a, 82b, 82c and 82d are used to secure the submersible vehicle 80 to the expanding gases bladders system 81a and 81b. Bladders to submersible vehicles attachment straps 82a, 82b, 82c and 82d are made of any type of materials and are of any lengths. In some embodiments the bladders to submersible vehicles attachment straps 82a, 82b, 82c and 82d may be constructed as an attachment means that is also a gas hose to fill the bladders with gases.

Each of the components of the flare and gas powered system described herein may be manufactured and/or assembled in accordance with the conventional knowledge and level of a person having skill in the art.

While various details, features and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

What is claimed is:

1. A flare and gas powered system, comprising:
a water tank chamber configured to receive water;
a steam producing chamber fluidly coupled to the water tank chamber and configured to receive water from the water tank chamber;
a flare and gas burning and reforming chamber disposed adjacent to the steam producing chamber, the flare and gas burning and reforming chamber separated from the steam producing chamber by a shared wall, wherein the flare and gas burning and reforming chamber is fluidly coupled to the water tank chamber;
a flare at least partially disposed inside the flare and gas burning and reforming chamber, the flare comprising an end configured to burn within the flare and gas burning and reforming chamber; and
a steam powered electric generator fluidly coupled to a top portion of the steam producing chamber;
wherein the flare and gas burning and reforming chamber is a steam pressurized chamber.

2. The system of claim 1, further comprising a first dumped water and sludge containment tank coupled to a bottom of the water tank chamber, the first dumped water and sludge containment tank comprising a first tank drainage valve configured to drain out water and sludge.

3. The system of claim 1, further comprising a reciprocating engine, a turbine, a generator, or a combination thereof coupled to a top portion of the flare and gas burning and reforming chamber.

4. The system of claim 1, further comprising a water tank assembly fluidly coupled to the water tank chamber, the water tank assembly configured to transfer water to the water tank chamber, the water tank assembly further comprising a steam condenser disposed inside the water tank assembly.

5. The system of claim 4, wherein the steam powered electric generator is fluidly coupled to the steam condenser of the water tank assembly.

6. The system of claim 1, further comprising a first internal emergency high temperature electric heating element disposed within the steam producing chamber, wherein the first high temperature electric heating element is configured to create steam when injected with water from the water tank chamber.

7. The system of claim 6, further comprising a second internal emergency high temperature electric heating element disposed within the flare and gas burning and reforming chamber, wherein the second high temperature electric heating element is configured to create steam when injected with water from the water tank chamber.

8. The system of claim 1, further comprising a second dumped water and sludge containment tank coupled to a bottom portion of the steam producing chamber, the flare and gas burning and reforming chamber, or both, the second dumped water and sludge containment tank comprising a second drainage valve.

9. The system of claim 1, further comprising a steam pipe with a one-way check valve assembly fluidly to each of the steam producing chamber and the flare and gas burning and reforming chamber, the steam pipe with a one-way check valve assembly configured to pump steam from steam producing chamber into the flare and gas burning and reforming chamber.

10. The system of claim 1, further comprising a venting system coupled to the flare and gas burning and reforming chamber by an inlet pipe, the venting system configured to pump a gas into the flare and gas burning and reforming chamber for safely clearing the flare and gas burning and reforming chamber of volatile gases.

11. The system of claim 1, further comprising a pressure sealed ceramic tube conveyor surrounding the flare, the pressure sealed ceramic tub conveyor extends from the inside to an outside of the flare and gas burning and reforming chamber.

12. The system of claim 11, further comprising a flare storage and loading unit coupled to the pressure sealed ceramic tub conveyor, the flare storage and loading unit configured to feed one or more flares into the flare and gas burning and reforming chamber through the pressure sealed ceramic tube conveyor.

13. The system of claim 11, wherein the pressure sealed ceramic tube conveyor is configured to seal the flare and gas burning and reforming chamber from high pressure leakage of internal hot gases.

14. The system of claim 1, further comprising a flare ignitor disposed inside flare and gas burning and reforming chamber.

15. The system of claim 14, wherein the flare ignitor is configured to swivel or retract away from the end of the flare.

16. The system of claim 1, further comprising a flare cut-off tool disposed below the flare.

17. The system of claim 16, wherein the flare cut-off tool is configured as a closure gate to block the sealed ceramic tube conveyor.

18. The system of claim 16, wherein the flare cut-off tool is configured to swivel or retract away from the end of the flare.

19. The system of claim 1, further comprising a plurality of flares.

20. The system of claim 19, further comprising a plurality of pressure sealed ceramic tube conveyors.

* * * * *